Feb. 26, 1963

J. M. ALGINO 3,078,872

CONSTANT FLOW MIXING VALVE

Filed Feb. 11, 1957

Inventor
JOSEPH M. ALGINO

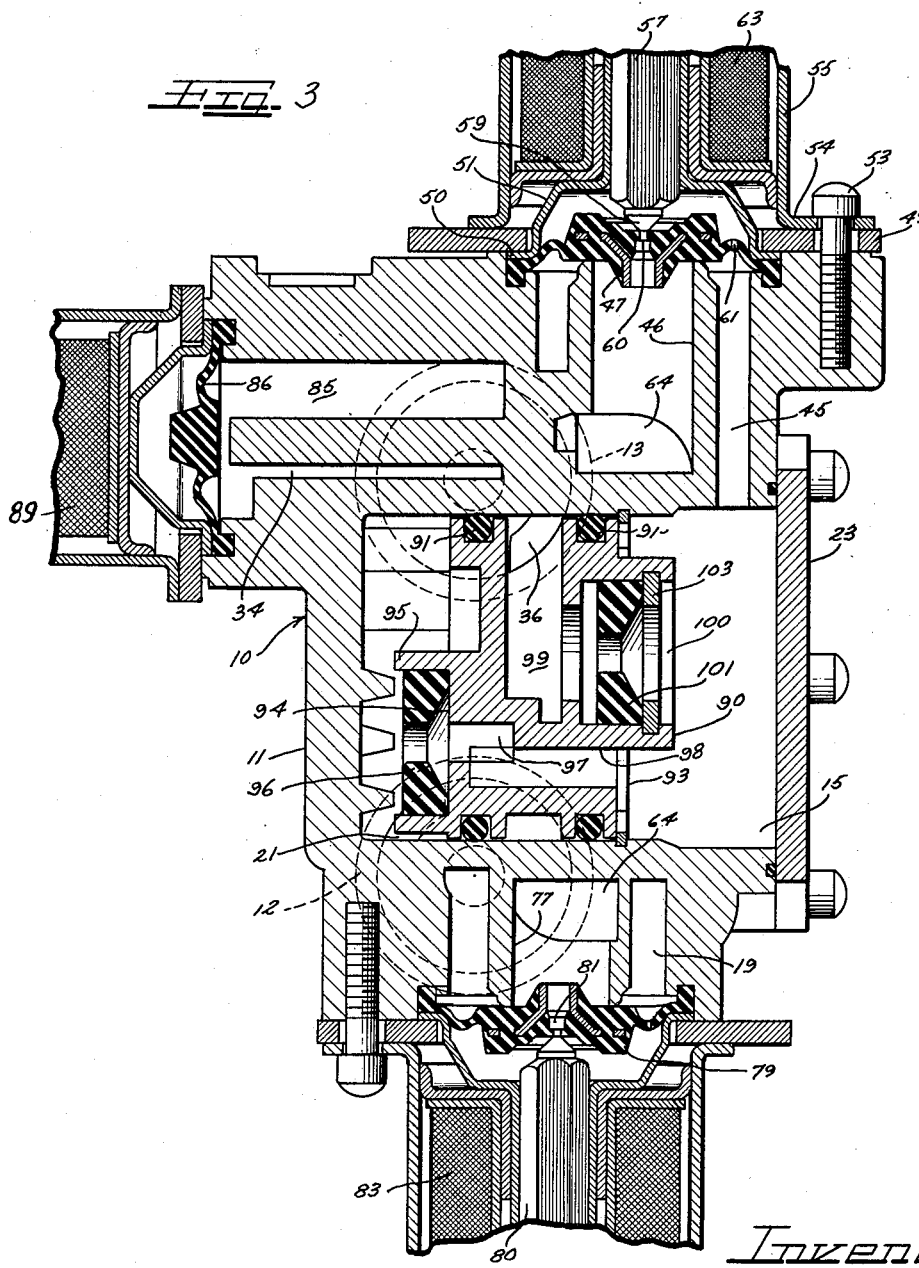

Feb. 26, 1963 J. M. ALGINO 3,078,872
CONSTANT FLOW MIXING VALVE
Filed Feb. 11, 1957 3 Sheets-Sheet 3
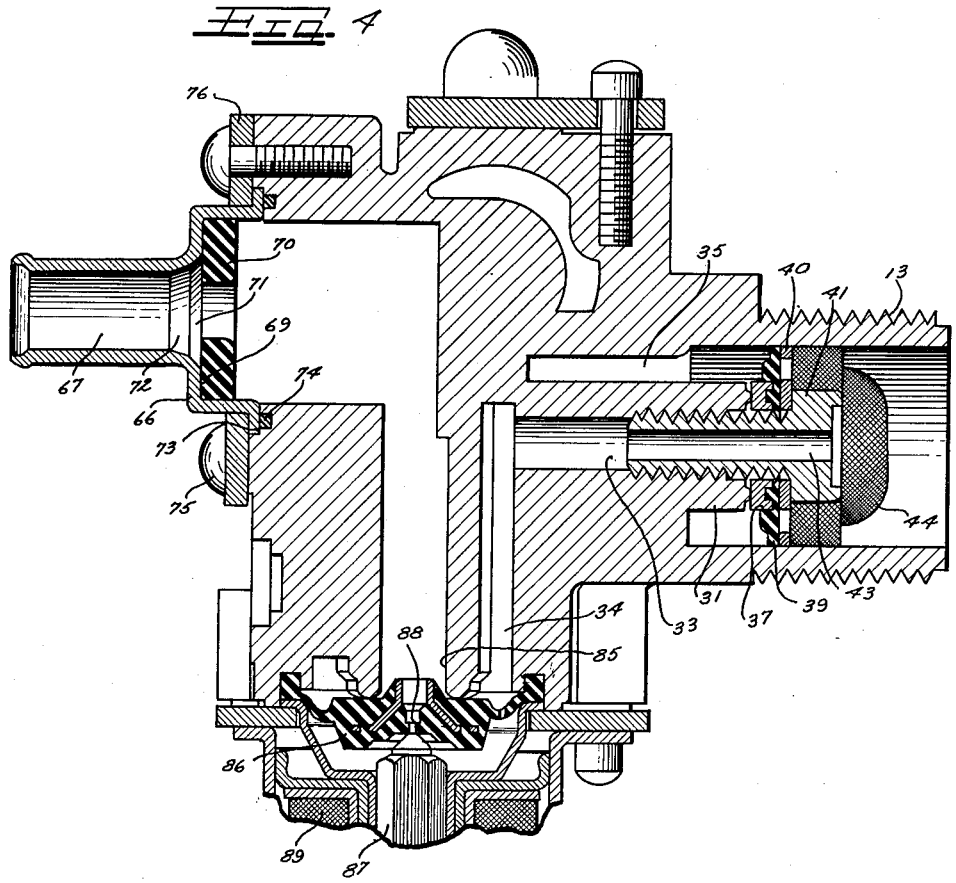
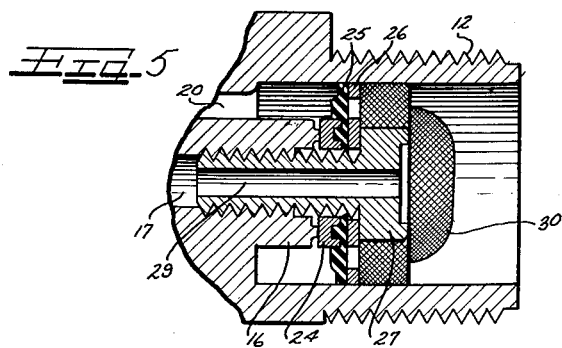
Inventor
JOSEPH M. ALGINO _United States Patent Office_ 3,078,872
Patented Feb. 26, 1963

3,078,872
CONSTANT FLOW MIXING VALVE
Joseph M. Algino, Chicago, Ill., assignor to The Dole Valve Company, Chicago, Ill., a corporation of Illinois
Filed Feb. 11, 1957, Ser. No. 639,283
2 Claims. (Cl. 137—605)

This invention relates to improvements in tempering valves for delivering hot water, cold water or tempered water at an intermediate temperature between the temperature of the hot and cold water.

A principal object of the invention is to provide a new and improved form of mixing valve for delivering a constant rate of flow of hot water, cold water and mixed water as selected.

Another object of the invention is to provide a solenoid controlled tempering valve particularly adapted for time-fill washing machines and the like for providing a constant rate of flow of hot, cold or tempered water.

A still further object of the invention is to provide an improved form of tempering valve particularly adapted for time-fill washing machines and the like having hot and cold water inlets leading directly to a mixing chamber and having an outlet passageway leading about the mixing chamber, with valves controlling the passage of hot and cold water through the outlet passageway, and a third valve controlling the passage of mixed water from the mixing chamber through said outlet passageway, together with uniform rate of flow control devices controlling the flow of hot and cold water into the mixing chamber and the flow of hot, cold and tempered water through the outlet.

Still another object of the invention is to provide an efficient form of mixing valve having a central mixing chamber and delivering a uniform flow rate of hot, cold or tempered water as selected, in which the hot and cold water are supplied to the mixing chamber under the control of individual uniform rate of flow control devices supplying hot and cold water thereto at substantially half the flow rate of water delivered through the outlet of the valve, and in which the delivery of water through the outlet of the valve is controlled by a third uniform rate of flow control device delivering water at a rate of flow at substantially twice the rate of flow of hot and cold water delivered to the mixing chamber.

These and other objects of the invention will appear from time to time as the following specification proceeds and with reference to the accompanying drawings wherein:

FIGURE 3 is a fragmentary sectional view taken substantially along line III—III of FIGURE 2;

FIGURE 4 is a transverse sectional view taken substantially along line IV—IV of FIGURE 2; and FIGURE 5 is a sectional view taken substantially along line V—V of FIGURE 2.

Figure 1:
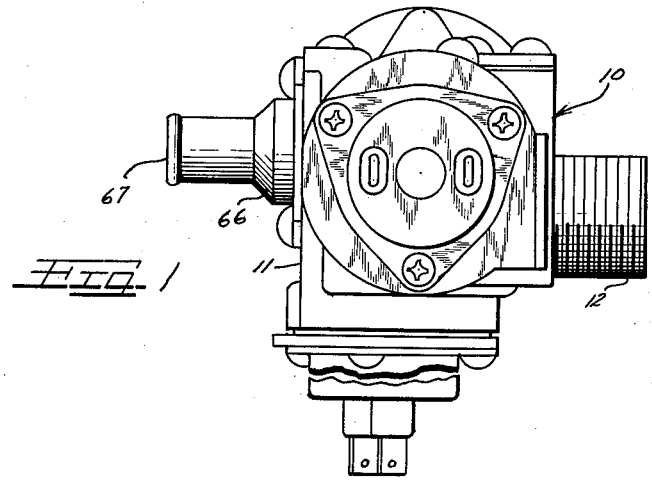
FIGURE 1 is a top plan view of a tempering valve constructed in accordance with the invention.
Figure 2:
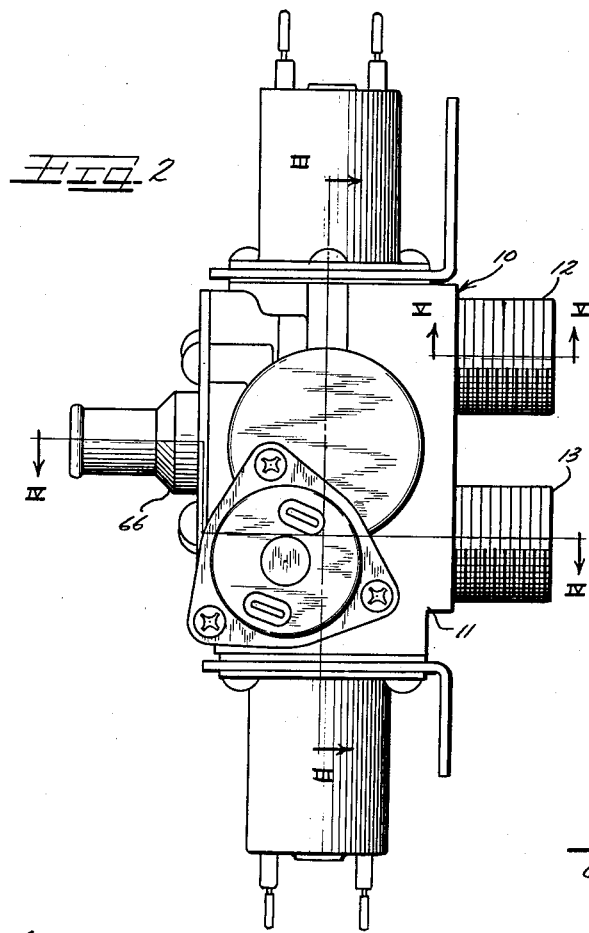
FIGURE 2 is a view in side elevation of the valve shown in FIGURE 1.

In the embodiment of the invention illustrated in the drawings, a tempering or mixing valve 10 is shown as comprising a valve body 11 having spaced hot and cold water inlets 12 and 13, respectively, and having a central mixing chamber 15 within said valve body in direct communication with said hot and cold water inlets.

The valve body 11 may be molded from any suitable material, but is preferably molded from a thermoplastic material, such as "nylon" thermoplastic material, which may readily be molded to the desired form and which is unaffected by the heat of the hot water.

The hot water inlet 12 is shown in FIGURES 3 and 5 as having a central boss 16 spaced inwardly of the wall thereof and having a passageway 17 leading therealong and having communication with an annular passageway 19 opening to one end of the valve body 11. The hot water inlet 12 also has a passageway 20 extending about the outside of the boss 16 and having communication with the mixing chamber 15 through a port 21 spaced adjacent the opposite end of said mixing chamber from an end plate 23 closing said mixing chamber.

The boss 16 terminates short of the inlet end of the hot water inlet 12 and has an annular seating member 24 on the outer end thereof, which forms a seat for the inner marginal portion of a resilient annular check valve 25, extending outwardly of said boss to the wall of the cold water inlet. The check valve 25 is abutted at its outer face by an apertured washer 26, retained in position by a hollow screw 27 threaded within said boss and having a passageway 29 leading therealong in axial alignment and having communication with the passageway 17. Watering entering the hot water inlet 12 thus may flow through the apertures of the apertured washer 26 and flex the check valve 25 inwardly with respect to the retainer 24, to accommodate the flow of hot water along the inlet passageway 20 into the mixing chamber 15 through the port 21. A screen 30, herein shown as being generally hat-shaped in form, is seated in the inlet 12 against the washer 26.

The cold water inlet 13 has an annular boss 31 therein terminating short of the open end of said inlet and having a passageway 33 leading therealong having communication with an annular passageway 34 opening to a side of the valve body 11 perpendicular to the face of the valve body through which the annular passageway 19 opens. The cold water inlet 13 also has a passageway 35 extending about the annular boss 31 and having communication with the mixing chamber 15 through a port 36 leading through the wall thereof and spaced from the port 21 toward the end closure plate 23 for said mixing chamber.

The boss 31 like the boss 16 has a seating member 37 on the end thereof, forming a seat for a check valve 39 admitting hot water into the passageway 35, but blocking the back flow of water from said passageway into the inlet 13. The check valve 39 is retained in position by an apertured washer 40 and a hollow screw 41 threaded within the boss 31 and having a passageway 43 leading therealong and forming an unrestricted passageway for cold water from the inlet 13 to the passageway 33. A screen 44 like the screen 27 is seated adjacent the washer 40 and extends over the passageways 43 and 35.

A passageway 45 leads from the mixing chamber 15 adjacent the cover 23 and opens to an open end of the valve body in the form of an annular passageway surrounding a port 46 closed by a diaphragm valve 47.

The diaphragm valve 47 is a well known form of solenoid controlled type of diaphragm valve and closes the end of the passageway 45 and affords communication from the passageway 45 to the port 36 when the diaphragm valve 47 is open. Said diaphragm valve is retained in sealing engagement with the open end of the valve body 11 at its periphery by a yoke 49 abutting an outer flanged portion 50 of an end cap and guide 51 and pressing said flange into engagement with the outer marginal portion of the diaphragm valve 47. Suitable screws, which may be self-tapping screws 53 extend through a flanged portion 54 of a solenoid casing 55 and through the yoke 49 to retain the solenoid and casing 55 to the end of the valve body and to retain the end cap 51 in sealing engagement with the marginal portion of the diaphragm valve 47. The end cap 51 forms a guide for an armature 57 having a conical inner end portion 59 biased into engagement with a port 60 leading through the center of the diaphragm valve 47. The diaphragm valve 47 has a bleeder passageway 61 leading therethrough to pass water from one side of the diaphragm to the other and create a pressure differential on both sides of the diaphragm when the orifice 60 is closed by the conical end portion 59 of the armature 57, and thus to maintain the valve closed by the pressure of water acting on the outer face thereof. Upon energization of a coil 63 of the solenoid, the armature 57 will move out of engagement with the central orifice 60, relieving pressure from the outer side of the diaphragm valve 47 and effecting the opening of the valve by the pressure of fluid on the underside thereof.

When the diaphragm valve 47 is open, fluid under pressure will flow from the passageway 45 through the port 46 and out through a passageway 64 extending about the mixing chamber and closed by an outlet fitting 66 in the form of a plate secured to and extending along the opposite side of the valve body from the inlets 12 and 13.

The outlet fitting 66 has an outlet passageway 67 extending therealong and has a shoulder 69 at the inlet end of said passageway forming a seat for a uniform rate of flow control device 70. The uniform rate of flow control device is shown as being in the form of a resilient annulus flexing with respect to the seat 69 into two adjoining frusto-conical surfaces 71 and 72, as the pressure acting thereon increases, to reduce the cross-sectional area of the orifice through said annulus upon increases in pressure of the fluid flowing through the outlet 67. The resilient flow control annulus 70 is constructed and operates on principles similar to those shown and described in Patent No. 2,454,929 which issued to Leslie A. Kempton on November 30, 1948 and no part of the present invention so not herein shown or described further. The fitting 66 is secured to a recessed portion 73 of the valve body into engagement with a seal 74 extending about the passageway 64, as by screws 75 extending through a yoke 76 and threaded within the valve body 11, for maintaining the fitting 66 in sealing engagement therewith.

The hot water annular passageway 19, like the tempered or mixed water annular passageway 45 encircles a port 77 opening to the opposite end of the valve body from the port 46 and having communication with the passageway 64 at its inner end for discharging hot water directly through the outlet passageway 67 upon opening of a diaphragm solenoid controlled valve 79. The valve 79 is like the valve 47 and closes the port 77 when an armature 80 is in engagement with a central orifice 81. Upon the energization of a magnet coil 83 surrounding said armature, to effect opening of the orifice 81, the valve will open by the pressure of water acting on the underside thereof. Thus upon energization of the magnet coil 83 and opening of the valve 79, hot water will flow directly from the hot water inlet 12 through the port 77 and passageway 64 out through the outlet 67 under the control of the uniform rate of flow control device 70.

In a like manner the passageway 34 having communication with the cold water inlet 13 through the passageway 33 leading through the center of the boss 31, encircles a port 85 having communication with the passageway 64 and closed by a pressure operated solenoid controlled diaphragm valve 86, like the diaphragm valves 47 and 79, and opening upon the disengagement of an armature 87 from an aperture 88 leading through the center of said valve, upon energization of a magnet coil 89 encircling said armature.

Thus hot or cold water may be supplied through the outlet 67 at a uniform flow rate under the control of the flow control annulus 70 by energization of either of the magnet coils 83 or 89, effecting opening of the respective valves 79 or 86 as selected.

Referring now to the flow control means for delivering a uniform rate of flow of hot and cold water into the mixing chamber 15 over a wide range of variations in pressure of the hot and cold water at the source, a cage 90 is mounted within the mixing chamber 15 and sealed to the wall thereof as by spaced O-rings 91 extending about said cage and recessed therein and having engagement with the cylindrical wall of the mixing chamber 15. A snap ring 93, shown as being snapped to the wall of the mixing chamber 15 is provided to retain the cage 90 in position.

The cage 90 has an annular shoulder 94 adjacent one end thereof surrounded by an annular wall 95 and forming a seat for a resilient annular flow control device 96. Passageway 97 leads from said shoulder along a wall 98 of the cage 90 and affords a communicating passageway from the hot water inlet port 21 to the mixing chamber 15.

The cage 90 also has a passageway 99 therein in communication with the cold water inlet port 36 and leading along the opposite side of the wall 98 from the passageway 97 and opening to the mixing chamber 15 through an enlarged diameter passageway 100. A resilient annular flow control device 101 is shown as being provided in the enlarged diameter passageway 100 and as being seated against a ring 103, which may be a snap ring snapped within the enlarged diameter passageway 100 adjacent the outlet end thereof.

The resilient annular flow control devices 96 and 101 both operate on the same principles and as hereinshown have the flow characteristics contoured therein like the flow control device shown and described in Patent No. 2,775,984 which issued to Robert R. Dahl on January 1, 1957. Each flow control device 96 and 101 is calibrated to deliver the same flow rate of hot and cold water into the mixing chamber 15, which may be half the flow rate of tempered water delivered through the flow control device 70. Therefore, where the valve has a delivery rate of 6 g.p.m., the flow control devices 96 and 101 will have delivery rates of 3 g.p.m. and will provide uniform rates of flow of hot and cold water into the mixing chamber 15 over wide ranges of variations in pressure of the hot and cold water at the source.

It may be seen from the foregoing that a simplified form of non-thermostatic tempering valve has been provided assuring a uniform mixture of hot and cold water in the mixing chamber 15 for delivery through the outlet 67 at a uniform rate of flow under the control of the uniform rate of flow control device 70, upon energization of the magnet coil 63, effecting opening of the diaphragm valve 47. It may further be seen that either hot or cold water may be delivered to the outlet 67 under the control of the uniform rate of flow control device 70 by the energization of either of the magnet coils 83 or 89 to effect opening of the respective diaphragm valves 79 or 86, and that in all instances the delivery rate of the hot water, the cold water and the tempered water will be uniform, making the valve particularly suitable for machines, such as washing machines and the like in which the admission of water to the washing machine tub is controlled solely by time.

It will be understood that various modifications and variations of the present invention may be effected without departing from the spirit and scope of the novel concepts thereof.

I claim as my invention:

1. A mixing valve comprising a housing having separate hot and cold inlets and a mixed fluid outlet; partition-forming wall means within a central portion of said housing defining two separated paths for the flow of fluids in separate streams from the inlets to the outlet; flow control means seated in each of the path-forming portions of said wall means for maintaining constant flow conditions in each of the hot and cold streams wherein the housing is formed with a central cavity therein and the partition-forming wall means comprises a unitary insert structure disposed within said cavity, said insert structure having a pair of generally cylindrical pockets formed at different points thereon, each of the aforementioned flow control means comprising a resilient flow control annulus seated in a respective one of the pockets.

2. A mixing valve comprising a housing having separate hot and cold inlets and a mixed fluid outlet; partition-forming wall means within a central portion of said housing defining two separated paths for the flow of fluids in separate streams from the inlets to the outlet; flow control means seated in each of the path-forming portions of said wall means for maintaining constant flow conditions in each of the hot and cold streams wherein the housing is formed with a central cavity therein and the partition-forming wall means comprises a unitary insert structure disposed within said cavity, said insert structure having a pair of generally cylindrical pockets formed at different points thereon, each of the aforementioned flow control means comprising a resilient flow control device seated in a respective one of the pockets.

References Cited in the file of this patent

UNITED STATES PATENTS

| | | |
|---|---|---|
| 2,528,422 | Chace | Oct. 31, 1950 |
| 2,542,279 | Kempton | Feb. 20, 1951 |
| 2,558,962 | Kempton | July 3, 1951 |
| 2,620,134 | Obermaier | Dec. 2, 1952 |
| 2,698,027 | Branson | Dec. 28, 1954 |
| 2,708,092 | Smith | May 10, 1955 |
| 2,712,324 | Lund | July 5, 1955 |
| 2,800,137 | Fraser | July 23, 1957 |
| 2,826,367 | Cobb | Mar. 11, 1958 |